US008135577B2

(12) United States Patent  (10) Patent No.: US 8,135,577 B2
Seymour et al.                (45) Date of Patent:     Mar. 13, 2012

(54) BRAILLE SUPPORT

(75) Inventors: Eric Taylor Seymour, San Jose, CA (US); Reginald Dean Hudson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 885 days.

(21) Appl. No.: 11/760,758

(22) Filed: Jun. 9, 2007

(65) Prior Publication Data

US 2008/0303645 A1    Dec. 11, 2008

(51) Int. Cl.
    *G06F 17/27* (2006.01)

(52) U.S. Cl. ........ 704/9; 340/407.1; 340/407.2; 341/21; 345/173; 348/62; 382/114; 434/112; 434/114; 434/322; 704/2; 709/205; 709/246; 715/201; 715/234; 715/700; 715/729; 715/854

(58) Field of Classification Search ........ 434/114, 434/112, 322; 704/2; 709/205, 246; 345/173; 340/407.1, 407.2; 341/21; 348/62; 715/201, 715/700, 729, 854
See application file for complete search history.

(56) References Cited

U.S. PATENT DOCUMENTS

| | | | |
|---|---|---|---|
| 6,140,913 A * | 10/2000 | Okada et al. ............ 340/407.2 |
| 6,542,623 B1 * | 4/2003 | Kahn ...................... 382/114 |
| 6,549,221 B1 * | 4/2003 | Brown et al. ............ 715/854 |
| 6,948,937 B2 * | 9/2005 | Tretiakoff et al. ........ 434/112 |
| 7,054,952 B1 * | 5/2006 | Schwerdtfeger et al. ..... 709/246 |
| 2002/0124020 A1 * | 9/2002 | Janakiraman et al. ........ 707/513 |
| 2002/0138521 A1 * | 9/2002 | Sharp ......................... 707/523 |
| 2002/0143878 A1 * | 10/2002 | Birnbaum et al. ........... 709/205 |
| 2002/0155419 A1 * | 10/2002 | Banerjee et al. ............ 434/322 |
| 2003/0090474 A1 * | 5/2003 | Schaefer .................. 345/173 |
| 2003/0117490 A1 * | 6/2003 | Tecu et al. ................ 348/62 |
| 2003/0122689 A1 * | 7/2003 | Romeo et al. ............. 341/21 |
| 2003/0134256 A1 * | 7/2003 | Tretiakoff et al. .......... 434/112 |
| 2004/0143430 A1 * | 7/2004 | Said et al. ................ 704/2 |
| 2005/0079472 A1 * | 4/2005 | Shimamura et al. ......... 434/114 |
| 2005/0221260 A1 * | 10/2005 | Kikuchi et al. ............ 434/112 |
| 2006/0230340 A1 * | 10/2006 | Parsons et al. ............ 715/514 |
| 2006/0288283 A1 * | 12/2006 | Schrepp et al. ........... 715/700 |
| 2007/0055938 A1 * | 3/2007 | Herring et al. ............ 715/729 |
| 2007/0229233 A1 * | 10/2007 | Dort ...................... 340/407.1 |
| 2008/0145822 A1 * | 6/2008 | Bucchieri ................ 434/114 |

OTHER PUBLICATIONS

Seymour, Eric T. et al., "Spoken Interfaces," U.S. Appl. No. 10/956,720, filed Oct. 1, 2004, Apple Inc.

* cited by examiner

*Primary Examiner* — Richemond Dorvil
*Assistant Examiner* — Michael Colucci
(74) *Attorney, Agent, or Firm* — Blakely, Sokoloff, Taylor & Zafman LLP

(57) ABSTRACT

Methods and apparatuses to provide improved Braille support are described herein. A connection to a Braille device is received, and a Braille caption panel that includes a Braille code is displayed to simulate an output to the Braille device. The Braille caption panel can include a text translated to the Braille code. The Braille caption panel can include a control element. An accessibility service can be automatically launched to provide the output to the Braille device.

33 Claims, 11 Drawing Sheets

BRAILLE SUPPORT

COPYRIGHT NOTICES

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright ©2007, Apple Inc., All Rights Reserved

FIELD OF THE INVENTION

Embodiments of the invention relate to data processing systems, and more particularly, to assisting visually impaired users to access and interact with data processing systems.

BACKGROUND

Most modern operating systems provide a rich graphical user interface (GUI) as the primary means of interacting between a user and the applications and resources of the system. GUIs, while useful to most people, impose a significant challenge to those with disabilities such as blindness, visual impairment, and gross or fine motor challenges.

An individual with a physical or visual impairment or similar disability may install and utilize accessibility software on their personal computer. Accessibility software may provide a set of tools to assist a physically or visually impaired user. The set of tools includes a screen reader that reads the text being displayed on the screen, and a navigation tool to allow a user to navigate the operating system GUI using only the keyboard, or in some cases by adapting a pointing device (e.g., mouse) input.

Typically, the screen readers, such as JAWS™ and Window Eyes™ may operate on Windows™ environment. The screen reader Voice Over™ produced by Apple Inc., located in Cupertino, Calif. may be used for Macintosh™ environment. The screen reader may identify and interpret what is being displayed on the screen. This interpretation may be represented to the user with text-to-speech, sound icons, or a Braille output.

The accessibility software for impaired users may work with external hardware devices to allow output to be streamed to a refreshable Braille display. The Braille display typically is a device that allows a blind person read the contents of a display one text line at a time in the form of Braille characters, each displayed in a Braille cell. Typically, a Braille cell has six or eight movable pins in a rectangular array. The pins can rise and fall depending on the electrical signal they receive. There are usually 20, 40, 65, or 80 arrays per line of text, depending on the device. The screen reader may gather the content of the screen and send it to the Braille display.

As the amount of graphics content on the screen increases, it becomes more difficult for the screen reader to interpret and describe graphical information to send it to the Braille display. That impacts the ability of the user to effectively interact with the computer system.

Additionally, existing accessibility software may conflict with other applications or be unable to properly describe these applications unless the applications are specifically designed to be used with a particular accessibility application that hinders the ability of the impaired user to operate an application or navigate the screen.

Currently, to operate a Braille device with a computer, a user may need to purchase, install, and configure an accessibility software that operates on this computer. After installing the accessibility software, the user may need to configure the Braille device with this computer by, for example, setting up a utility application. These actions needed to be performed by the user to operate the Braille device not only consume time, but also impact ability of the user with impaired vision to access a computer in a public place; e.g., a library or a school.

SUMMARY OF THE DESCRIPTION

Methods and apparatuses to provide improved Braille support are described herein. A connection to a Braille device is received, and a Braille caption panel that includes a Braille code is displayed to simulate an output to the Braille device. The Braille caption panel can include a text translated to the Braille code. The Braille caption panel can include a control element to simulate a control element on the Braille device. An accessibility service can be automatically launched to provide the output to the Braille device.

In at least some embodiments, a first selection on a display is received. A first output that is associated with the first selection is provided to a Braille device. The Braille device may include at least one control element. A Braille caption panel that includes a first Braille code that simulates the first output can be displayed. The Braille caption panel may include at least one control element. The Braille caption panel can include a first text translated to the first Braille code.

In at least some embodiments, a second selection on the display is received. A second output that is associated with the second selection is provided to the Braille device. The Braille caption panel that includes a second Braille code that simulates the second output can be displayed. The Braille caption panel can include a second text translated to the second Braille code.

In at least some embodiments, a third selection of the at least one control element on the Braille caption panel is received. The Braille caption panel is displayed that includes a third Braille code, which simulates a third output that is provided to the Braille device when the at least one control element of the Braille device is selected. The Braille caption panel may be displayed in response to the third selection. The Braille caption panel can include a third text translated to the third Braille code.

In at least some embodiments, a connection to a Braille device is received. An accessibility service can be automatically launched in response to the receiving to provide an output to the Braille device. A Braille caption panel that includes a Braille code to simulate the output to the Braille device can be displayed.

Other features of the present invention will be apparent from the accompanying and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
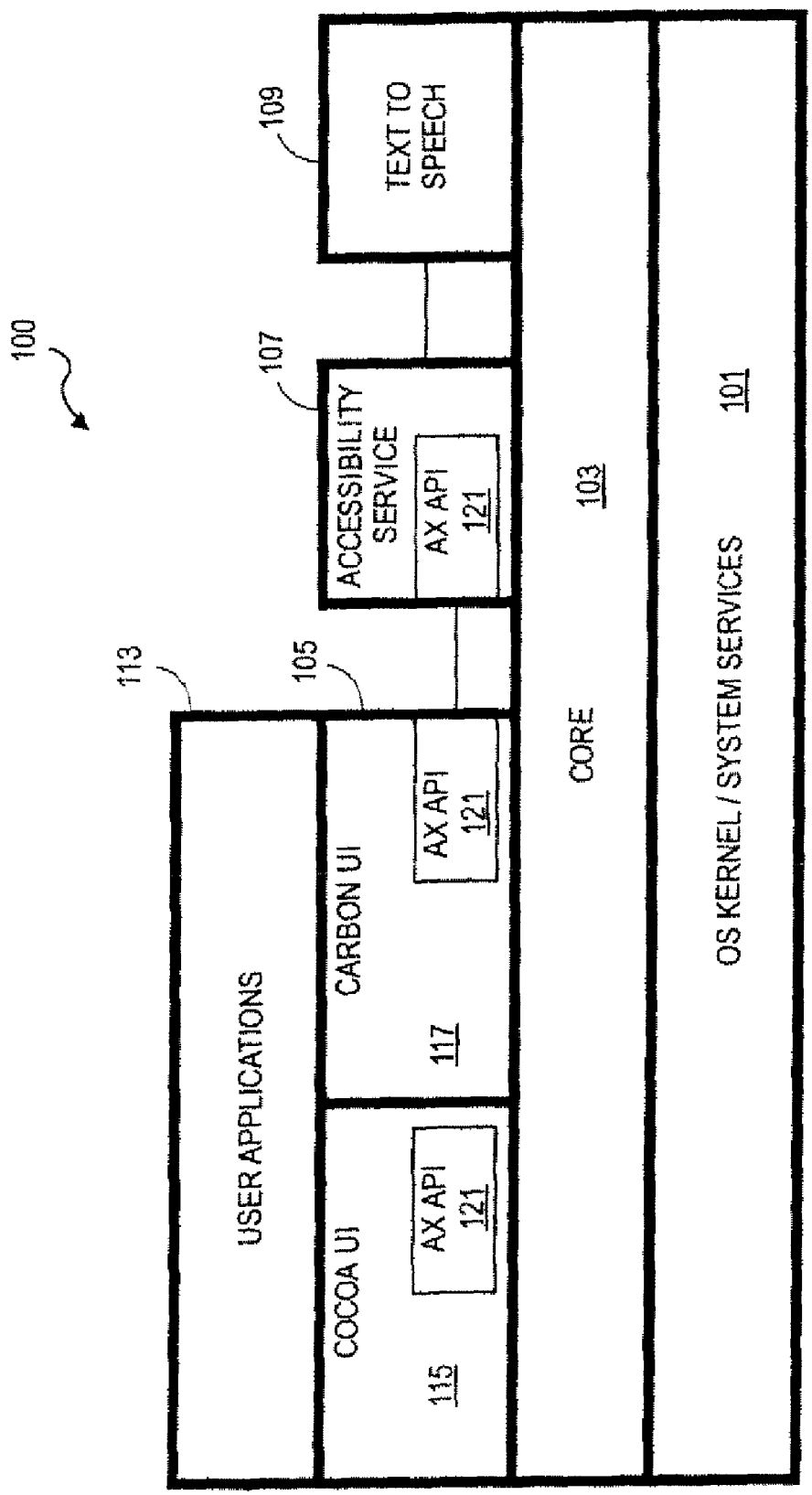
FIG. 1 is a diagram of one embodiment of the software architecture for a computer system that provides an improved Braille support.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk, including floppy disks, optical disks. CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of media.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

FIG. 1 is a diagram of one embodiment of the software architecture for a computer system that provides an improved Braille support. In one embodiment, the software architecture 100 may be executed by a general computer system such as a home desktop system, office workstation or similar computer system. In one embodiment, the software architecture 100 may include multiple architectural 'layers' including a core operating system and system services layer or 'kernel' layer 101, a core layer 103, user interface layer 105, user application layer 113 or similar architectural layers or components. In one embodiment, an accessibility service 107 and text-to-speech program 109 may be at the same layer or level as the user interface layer 105.

In one embodiment, the kernel layer 101 may be responsible for general management of system resources and processing time. The kernel 101 may schedule programs for execution, manage memory, service interrupts and perform similar core system tasks. In one embodiment, the core layer 103 may provide a set of interfaces, programs and services for use by the kernel 101, user interface layer 105 including accessibility service 107 and text-to-speech program 109 and user applications 113.

In one embodiment, the user interface layer 105 may include advanced programmer interfaces (APIs), services and programs to support user applications 113 and the operating system user interface. In one embodiment, the operating system may be the OS X operating system by Apple Inc. The user interface layer 105 may include the Cocoa user interface (UI) and Carbon UI 117. The Cocoa UI 115 provides a set of object oriented classes, APIs and similar resources to support the development of user applications and the user application environment. The Carbon UI 117 provides a set of procedural programs, utilities and APIs to support the development of user applications and the user application environment. Each user interface layer 105 component may include an accessibility API (AX API) 121 providing a set of classes, programs or utilities that facilitate the use of applications and the operating system by individuals with visual and physical impairments. Each AX API 121 may provide a set of classes, programs or utilities appropriate to the user interface layer in which it is placed. As used herein, the accessibility services are integrated with the operating system by implementation of the AX API 121 at the user interface layer or similar layer of the operating system.

In one embodiment, the accessibility service 107 may provide a set of utilities, tools and classes that support a set of integrated accessibility features. The accessibility service 107 may provide support for an accessibility cursor navigation tool, audible interface, a Braille device, and similar features for use by individuals with visual and physical impairments. The accessibility cursor and audible interface are described in greater detail in a co-pending U.S. patent application Ser. No. 10/956,720, filed Oct. 1, 2004, which is entitled "Spoken Interfaces" and which is owned by the assignee of the instant inventions. This application is incorporated herein by reference in its entirety.

In one embodiment, a separate text-to-speech module or program may also be present to convert text descriptions of programs, text in fields of programs and similar text into audible speech at the direction of the accessibility service 107. The audible interface and text-to-speech features may generate part of the accessibility presentation for a user. An accessibility presentation as used herein includes all non-standard user interface tools that assist an impaired user including audible output magnification, Braille output and similar output types.

In one embodiment, the user application layer 113 may be an environment and set of user applications that are directly utilized by a user. Input into the computer system may be provided by a user that is intended to control and interact with the user applications. User applications may be installed on the computer system by a user. User applications may include word processing applications, spreadsheet applications, video games, email programs, Internet browsers and similar applications. In one embodiment, the user applications that adopt the AX API are completely accessible by the accessibility service 107. User applications that do not adopt the AX API may provide reduced or minimal compatibility with the accessibility service 107.

Figure 2:
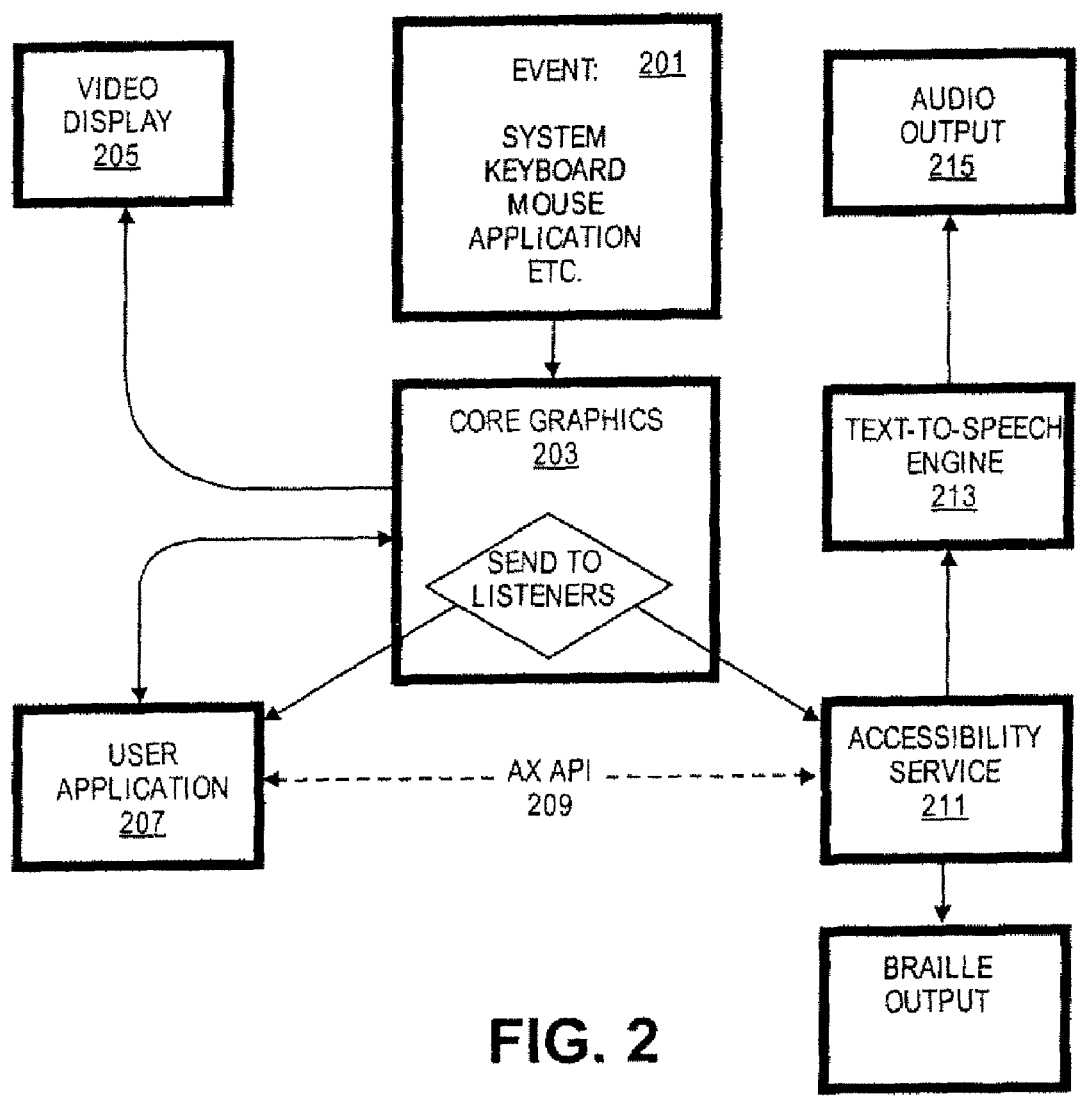
FIG. 2 is a flowchart of one embodiment of the function of the enhanced accessibility service in the computer system for an improved Braille support.

FIG. 2 is a flowchart 200 of one embodiment of the function of the enhanced accessibility service in the computer system for an improved Braille support. In one embodiment, the function of the accessibility service in the computer system is initiated by a system event (block 201). A system event may be an input received from a user through an input device such as a keyboard, mouse, or similar input device. A system event may also be generated by the operating system or computer system, such as a timers interrupt or similar system event. A user application or similar user program may also generate an event to initiate the enhanced accessibility service.

In one embodiment, the system event may be passed to core graphics system. The core graphics system may be responsible for managing the graphical user interface (GUI). The core graphics system may generate a signal to display the user interface on a video display at the direction of a user application or an accessibility service. The core graphics system or similar aspect of the operating system may determine the programs that are related to the system event and forward the system event to each of these programs or operating system components or similar system components.

In one embodiment, the system event may be forwarded by the core graphics system to both a user application and to an accessibility service (block 203). The user application may respond to the input including the generation of requests to the core graphics system to update the video display (block 207). For example, a user typing to a word processing application may generate a keyboard event for each key depressed. The keyboard event may be passed to the word processor, which is a user application. The user application then requests (block 207) that the core graphics system update the video display (block 203) to reflect the changes input by the user. In this example, the word processor may request that the input letters be displayed on the video display.

In one embodiment, the accessibility service receives the system event at approximately the same time as a user application or similar programs. The accessibility service analyzes the system event to determine any changes to the user interface and user application that may occur as a result of the system event (block 211). For example, if a mouse movement event is received the accessibility service may check to determine which user interface items are now being pointed to by a mouse cursor or accessibility cursor. The accessibility service may query the user application or similar program or component that received the same system event using the AX API (block 209) to determine what changes may have been made by the system event or to retrieve data related to the system event or a change in status for the user interface. For example, an accessibility cursor may be pointed at a word processor. As new characters are typed they are displayed through the interface. These additional letters may be gathered by the accessibility service as well as displayed by the user application for further processing to enhance accessibility (e.g., text-to-speech feedback). If a user provides input relating to navigation or program operation, the application would respond and the accessibility service would monitor to determine if an enhanced accessibility should be applied.

In one embodiment, if the accessibility service determines that the user interface data has changed or an element has been selected then related text or similar data may be passed to a text-to-speech engine 213 and/or a Braille output 217. Text-to-speech engine 213 may convert text or similar input data into an audio signal that may be output to an audio output port. The audio output may be connected with a speaker system or similar device to produce the audible feedback (block 215). Braille output 217 may convert text or similar input data into a Braille code that may be output to a Braille device (not shown). For example, the typed letters received by a word processor may each be announced as they are typed or converted to the Braille code. In another embodiment, the accessibility program may provide other utilities to a user based on gathered input data and status. Additional utilities include augmenting audible text-to-speech feedback with contextual information, navigation information and similar information. For example, a user input that changes the current active window may generate audible feedback describing the new window selected. In one embodiment, the additional utilities provided may include additional navigation options such as slider adjustment assistance that allows a user to input a value to set a scroll bar position in a slider for a window or similar interface, an augmented audible or visual navigation menu providing special navigation options and similar augmented services.

In one embodiment, the accessibility services may allow a user to specify the amount of audible, Braille or other output information provided by the accessibility presentation to a user. The accessibility service may provide an interface to set a 'chattiness' level. A low chattiness level may restrict the feedback information to minimal context information, to only return specifically selected data or similar minimal feedback. A high chattiness level may prompt the accessibility service to provide a verbose description of the context of an accessibility cursor or similar information.

Figure 3:
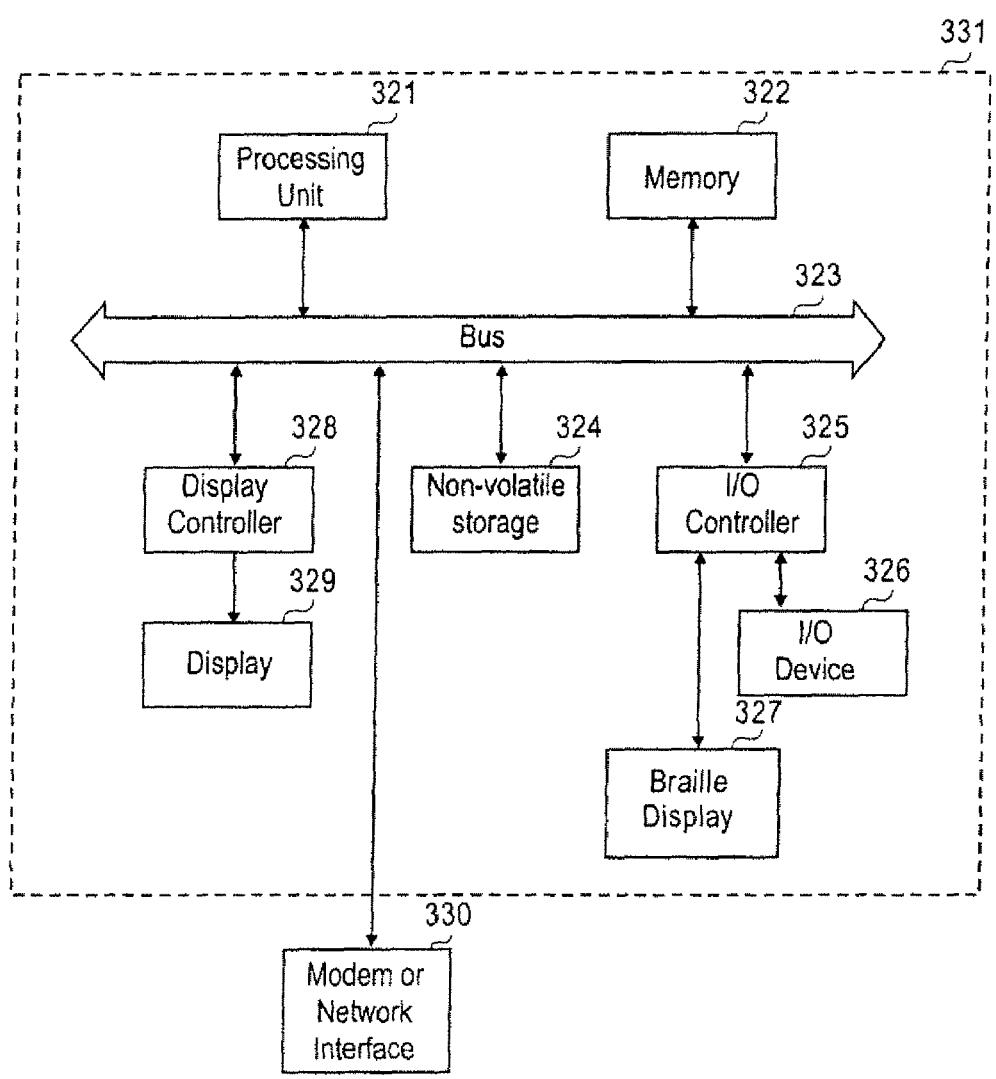
FIG. 3 shows one embodiment of a computer system to provide an improved Braille support.

FIG. 3 shows one embodiment of a computer system 300 to provide an improved Braille support, as described in further detail with respect to FIGS. 4, 5A-5D, and 6-8. A computer system 331 can interface to external systems through the modem or network interface 330, as shown in FIG. 3. It will be appreciated that the modem or network interface 330 can be considered to be part of the computer system 331. This interface 330 can be an analog modem, ISDN modem, cable modem, token ring interface, satellite transmission interface, or other interfaces for coupling a computer system to other computer systems.

Computer system 331 includes a processing unit 321 that may include a microprocessor, such as an Intel Pentium® microprocessor, Motorola Power PC® microprocessor, Intel Core™ Duo processor, AMD Athlon™ processor, AMD Turion™ processor, AMD Sempron™ processor, and any other microprocessor. Processing unit 321 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. For one embodiment, processing unit 321 includes a general purpose computer system based on the PowerPC®, Intel Core™ Duo, AMD Athlon™, AMD Turion™ processor, AMD Sempron™, HP Pavilion™ PC, HP Compaq™ PC, and any other processor families. Processing unit 321 may be a conventional microprocessor such as an Intel Pentium microprocessor or Motorola Power PC microprocessor.

As shown in FIG. 3, memory 322 is coupled to the processing unit 321 by a bus 323. Memory 322 can be dynamic random access memory (DRAM) and can also include static random access memory (SRAM). A bus 323 couples processing unit 321 to the memory 322 and also to non-volatile storage 324 and to display controller 328 and to the input/output (I/O) controller 325. Display controller 328 controls in the conventional manner a display on a display device 329 which can be a cathode ray tube (CRT) or liquid crystal display (LCD). The input/output devices 326 can include a keyboard, disk drives, printers, a scanner, and other input and output devices, including a mouse or other pointing device. The display controller 328 and the I/O controller 325 can be implemented with conventional well known technology. A Braille device 327, for example, a Braille display may be coupled to an I/O controller 325 to provide a Braille code to a user. The user can provide an input using the input device, such as a keyboard, and receive a feedback from the screen of the display device 329 using the Braille device 327.

The non-volatile storage 324 is often a magnetic hard disk, an optical disk, or another form of storage for large amounts of data. Some of this data is often written, by a direct memory access process, into memory 322 during execution of software in the computer system 331. One of skill in the art will immediately recognize that the terms "computer-readable medium" and "machine-readable medium" include any type of storage device that is accessible by the processing unit 321.

It will be appreciated that computer system 331 is one example of many possible computer systems which have different architectures. For example, personal computers based on an Intel microprocessor often have multiple buses, one of which can be an input/output (I/O) bus for the peripherals and one that directly connects the processing unit 321 and the memory 322 (often referred to as a memory bus). The buses are connected together through bridge components that perform any necessary translation due to differing bus protocols.

Network computers are another type of computer system that can be used with the embodiments of the present invention. Network computers do not usually include a hard disk or other mass storage, and the executable programs are loaded from a network connection into the memory 322 for execution by the processing unit 321. A Web TV system, which is known in the art, is also considered to be a computer system according to the embodiments of the present invention, but it may lack some of the features shown in FIG. 3, such as certain input or output devices. A typical computer system will usually include at least a processor, memory, and a bus coupling the memory to the processor.

It will also be appreciated that the computer system 331 is controlled by operating system software which includes a file management system, such as a disk operating system, which is part of the operating system software. One example of an operating system software is the family of operating systems known as Macintosh® Operating System (Mac OS®) or Mac OS X® from Apple Inc. of Cupertino, Calif. Another example of an operating system software is the family of operating systems known as Windows® from Microsoft Corporation of Redmond, Wash., and their associated file management systems. The file management system is typically stored in the non-volatile storage 324 and causes the processing unit 321 to execute the various acts required by the operating system to input and output data and to store data in memory, including storing files on the non-volatile storage 324.

Figure 6:
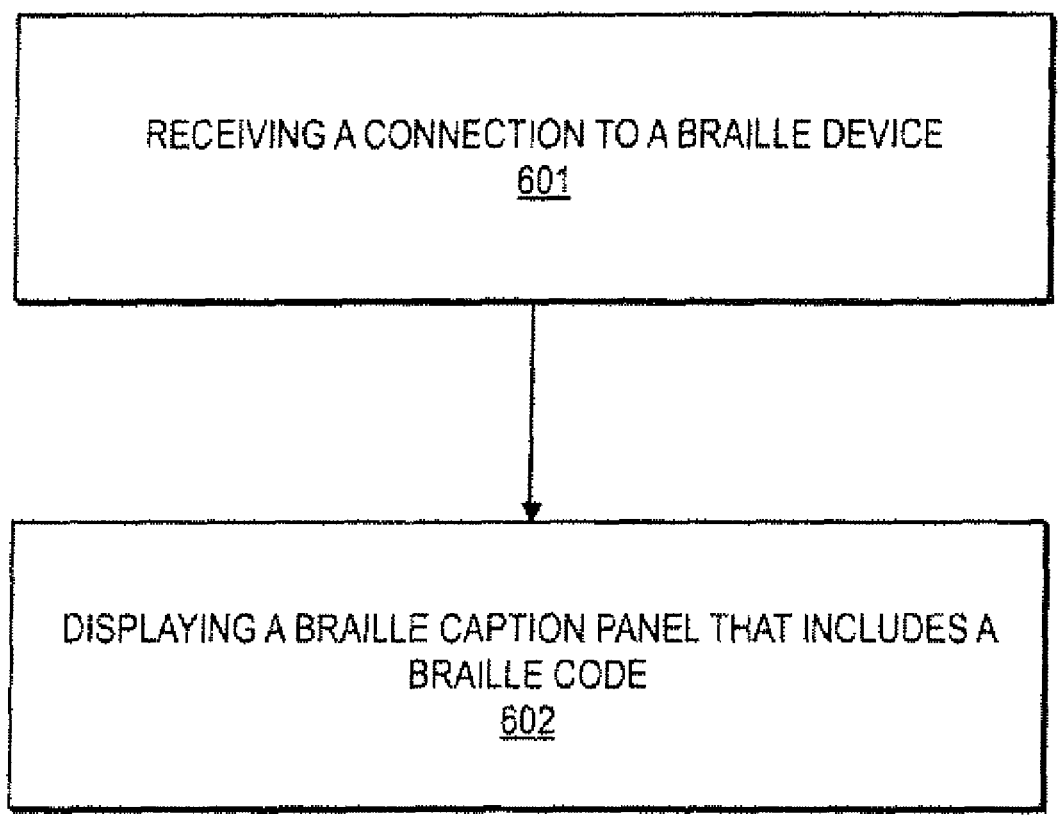
FIG. 6 shows a flowchart of one embodiment of a method to provide an improved Braille support.

FIG. 6 shows a flowchart of one embodiment of a method to provide an improved Braille support. Method 600 begins with operation 601 that involves receiving a connection to a Braille device. The connection to the Braille device may be received from an input/output controller (e.g., I/O controller 326 of FIG. 3), which is connected to a Braille device (e.g., Braille device 327 of FIG. 3) using a bus. In one embodiment, the connection to the Braille device is received via a USB port. In alternate embodiments, the connection to the Braille device may be received via a serial port; e.g., a Universal Serial Bus ("USB") port, a Bluetooth™, a FireWire™ port, a parallel port, or any combination thereof. In one embodiment, an accessibility service, for example, an accessibility software, such as VoiceOver™, is automatically launched in response to receiving the connection to the Braille device via the USB port. For example, the accessibility software, such as VoiceOver™, may be launched automatically as soon as the user plugs-in the Braille device into the USB port of the computer, such as a Macintosh™ computer. In one embodiment, the operating system of a data processing system recognizes the Braille device, and automatically launches the accessibility service in response to receiving the connection to the Braille device.

The Braille device, e.g., Braille device 327 of FIG. 3, may include one or more control elements (not shown) for a user, e.g., a blind user, to navigate a screen of a computer display; e.g., display device 329 of FIG. 3. The one or more control elements of the Braille device may be router buttons, directional controls (e.g., arrow keys), and/or any other interface elements. A router button (e.g., a sensor) can control the position of the text cursor on screen of the computer display. Typically, the router button is positioned above each Braille cell on the Braille display. Typically, pressing on the router button of a cell causes a text cursor of the computer system to move to the letter, which is associated with the cell, in the text on the screen of the computer display.

Referring back to FIG. 6, method 600 continues with operation 602 that involves displaying a Braille caption panel that includes a Braille code on a display device (e.g., display 329 of FIG. 3). In one embodiment, the Braille caption panel is displayed on a screen of the display device in response to receiving of the connection to the Braille device.

Figure 4:
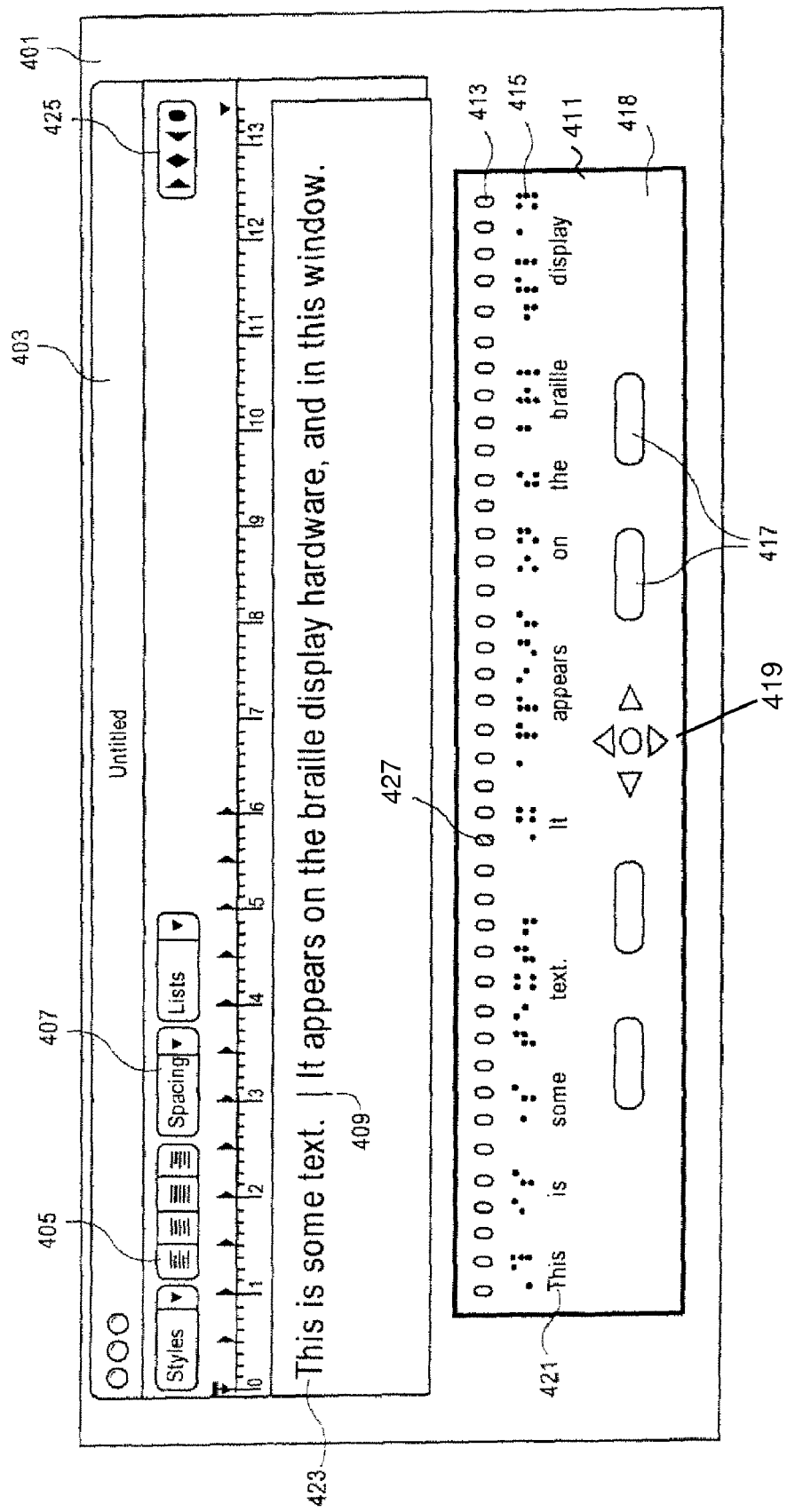
FIG. 4 illustrates one embodiment of a user interface that is presented on a screen of a computer display to provide an improved Braille support.

FIG. 4 illustrates one embodiment of a user interface 400 that is presented on a screen of a computer display to provide an improved Braille support. As shown in FIG. 4, user interface 400 includes an application window 403 and a Braille support caption panel 411 that are displayed on a desktop 401 on the screen. Application window 430 has controls 405, 407, and 425 for a user to interact with, and a text 423, as shown in FIG. 4. An accessibility cursor 429, for example, in a shape of a box, is placed over text 423, as shown in FIG. 4, to provide an output for a user with a visual disability, as described in a co-pending U.S. patent application Ser. No. 10/956,720, filed Oct. 1, 2004, which is incorporated herein by reference in its entirety.

In one embodiment, text 423 selected by accessibility cursor 429, is converted to a Braille code to provide an output to the Braille device.

As shown in FIG. 4, a Braille caption panel 411 includes a Braille code ("Braille text") 415 and a translated text 421 that is the text that has been transcribed to Braille code 415. As shown in FIG. 4, the original, pre-translated text 421 is placed centered underneath of corresponding Braille code 421. In one embodiment, Braille code 415 is a Grade one, Grade two, Grade three, or any combination thereof. Braille transcriptions. Generally, Grade 1 Braille transcription refers to a character-by-character transcription, Grade 2 Braille transcription may use contraction of a set of words to a single Braille character, and Grade 3 Braille transcription may include many additional contractions that are similar to a shorthand.

As shown in FIG. 4, Braille code 415 includes a plurality of dots that simulate pins on the display of the Braille device. In one embodiment, Braille caption panel 411 is placed on the top of the screen of the display device over all windows; e.g., window 403, displayed on desktop 401.

In one embodiment, as accessibility cursor 429 moves over desktop 401 to select various items on desktop 401, Braille caption panel 411 dynamically changes Braille code 415 and translated text 421 to correspond to the selected items, as described in further detail below with respect to FIGS. 5A-5D.

As shown in FIG. 4, Braille caption panel 411 includes one or more virtual control elements; e.g., virtual router buttons (e.g., a router button 413), virtual directional keys 419, and virtual miscellaneous keys 417. As shown in FIG. 4, the router buttons, such as router button 413, correspond to cells, such as a cell 427. As shown in FIG. 4, router button 413 is placed above cell 415. In one embodiment, the virtual control elements displayed in Braille caption panel 411 simulate the respective control elements of the Braille device. In one embodiment, pressing ("clicking") on a virtual control element of Braille caption panel 411 by using, for example, a mouse, simulates pressing the respective physical control element of the Braille device using, for example, a finger. For example, clicking on a virtual router button 427 above the Braille cell that represents a Braille code of word "It" can move a text cursor 409 to word "It" of text 423 in application window 403.

In one embodiment, a sighted user can press ("click") on virtual directional keys 419 using, for example, a mouse, and/or a key on a keyboard, to expand a view of caption panel 411 in horizontal and/or vertical directions. For example, a sighted user may click on the right arrow of directional keys 419, so that caption panel 419 is panned or scrolled in the right direction to display the Braille code of a portion of text 423 that is further right from the currently displayed text, such as text "hardware, and in this window". The Braille caption panel 411 also displays the translated text from this Braille code. That is, the sighted user, who may not know the Braille code, can see the Braille code, which is output to a blind user, and the translation of this Braille code. The sighted user can also click on virtual controls to mimic ("simulate") the panning button on the Braille device.

In one embodiment, Braille caption panel 411 can be expanded or contracted (not shown). In one embodiment, Braille caption panel 411 is expanded to be as wide as the width of the screen of the computer display device (not shown). The Braille caption panel 411 may be expanded, for example, by dragging a frame of Braille caption panel 411 using a mouse. In one embodiment, Braille caption panel 411 can be expanded to be wider than the physical width of the display of the Braille device. In one embodiment, the Braille caption panel 411 is expanded to display the Braille code 415 and the translated text 421 of a portion of the text 423 that is currently being outputted to the Braille device, and the Braille code 415 and the translated text 421 of the other portion of the text 423 that currently is not being outputted to the Braille device. For example, caption panel 411 can display the Braille code and translated text of the portion "This is some text. It appears on the Braille display" of text 423 that is currently being outputted to the Braille device and the Braille code and the translated text of the portion "hardware, and in this window" of text 423 that currently is not being outputted to the Braille device. In one embodiment, Braille caption panel 427 has a sub-window (not shown) that includes the Braille code and the translated text of the portion of the text 423 that is currently being outputted to the Braille device. In one embodiment, the Braille code and the translated text of the portion of the text 423 that is currently being outputted to the Braille device is selected (not shown), e.g., magnified, or highlighted, to be distinguished from the to the Braille code 415 and the translated text 421 of the portion of the text 423 that currently is not being outputted to the Braille device.

That is, Braille caption panel 411 allows a sighted user who does not know the Braille code to collaborate seamlessly with a user having a visual disability using the same computer. Braille caption panel 411 allows the sighted user to see what the blind user receives (e.g., feels) on the display on the Braille device. Using the Braille caption panel 411 the sighted user (e.g., a teacher) can provide a feedback to a user with a visual disability (e.g., a student) to increase the efficiency of navigation on the screen of the computer display.

Figure 5A:
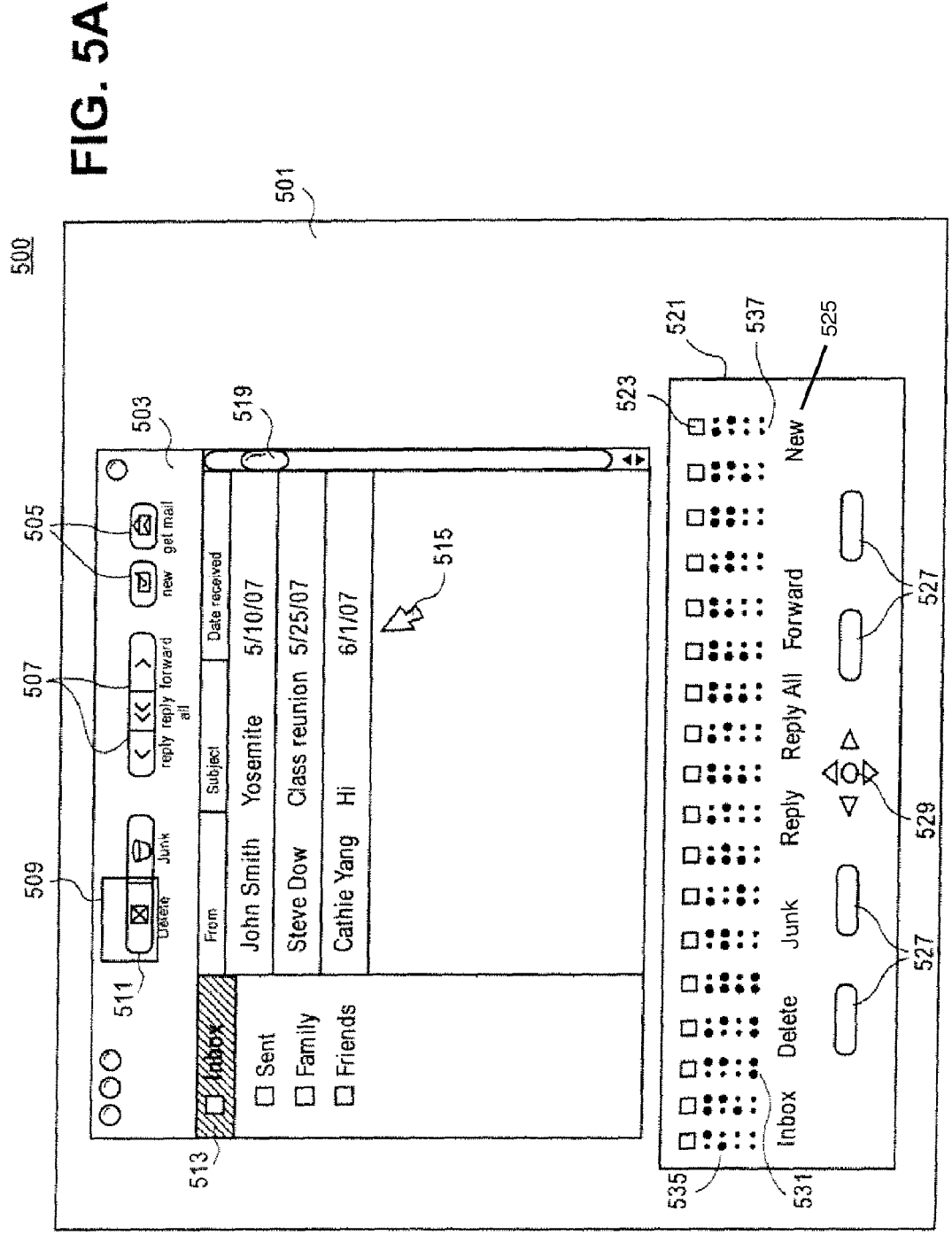
FIGS. 5A-5D illustrate one embodiment of navigation of a screen of the display device using a user interface with a Braille caption panel.

FIGS. 5A-5D illustrate one embodiment of navigation of a screen 500 of the display device using a user interface with a Braille caption panel. FIG. 5A shows one embodiment of a screen 500 that includes a desktop 501 having an application window 503, such as an email application window, and a Braille caption panel 521. Application window 503 has controls 505, 507, 511 (e.g., toolbars, keys, buttons, menu palettes, and the like) for a user to interact with. As shown in FIG. 5, item 513 ("Inbox") in application window 503 may be selected by using, for example, a mouse cursor 515, and/or by pressing a key on a keyboard.

As shown in FIG. 5A, an accessibility cursor 509 may be placed to select one or more items displayed on the screen 500. For example, accessibility cursor 509 may be placed over control 511 ("Delete"), as shown in FIG. 5A. In one embodiment, an audio output may be provided to describe items, e.g., a "Delete" toolbar 511, as selected by accessibility cursor 509. In one embodiment, in addition to Braille caption panel 521, another caption panel (not shown) is displayed on screen 500, so a sighted user can see what a blind user hears, as described in a co-pending U.S. patent application Ser. No. 10/956,720, filed Oct. 1, 2004, which is incorporated herein by reference in its entirety. A scroll bar 519 may be displayed to scroll the content of the window 503 in a vertical direction, as shown in FIG. 5A.

In one embodiment, an output to a Braille device is provided that is associated with the selection of the item using the accessibility cursor 509. In one embodiment, the output to the Braille device includes a Braille code that is associated with the selection of one or more items on screen 501.

As shown in FIG. 5A, a Braille caption panel 521 is displayed that includes a Braille code ("Braille text") 535 and a text 525 that is the text that has been transcribed to Braille code 535. As shown in FIG. 5A, Braille code 535 simulates the output to the Braille device. As shown in FIG. 5A, Braille code 535 is translated to text 525 "Inbox", "Delete", "Junk", "Reply", Reply ALL", "Forward", and "New". Braille code 535 may include items that are associated with a current position of accessibility cursor 509. The items associated with the position of the accessibility cursor 509 may be those items that correspond to a line on screen 500, as shown in FIG. 5A. In one embodiment, when accessibility cursor 509 is placed over an item; e.g., item "Delete", other items, e.g., "Inbox", "Junk", "Reply", and the like, that next to the selected item are gathered into a line to output to the Braille device to provide an information about the content and layout of the screen 500. The text 525 that has been transcribed (translated) to Braille code 535 is placed word-by-word centered underneath of corresponding Braille code 535. In one embodiment, Braille code 535 is a Grade one, Grade two, Grade three, or any combination thereof. Braille transcriptions. In one embodiment, cell 531 is displayed to underline the word "Delete" selected by accessibility cursor 511. As shown in FIG. 5A, cell 531 displays additional dots, e.g., $7^{th}$ and $8^{th}$ bottom dots, to underline the selected word. In one embodiment, as accessibility cursor 509 moves to another location on screen 500, another cell on Braille caption panel 521 may be underlined.

As shown in FIG. 5A, Braille code 435 includes a plurality of cells, such as a cell 537 that represent Braille characters. In one embodiment, Braille caption panel 521 is placed on the top of the screen 500 of the display device over all windows displayed on desktop 501.

As shown in FIG. 5A, Braille caption panel 521 includes one or more virtual control elements, e.g., virtual router buttons (e.g., a router button 523), virtual directional keys 529, and other virtual keys 527. In one embodiment, the control elements displayed in Braille caption panel 521 simulate physical (real) control elements of the Braille device. In one embodiment, pressing ("clicking") on a virtual control element of Braille caption panel 521 using, for example, a mouse, simulates pressing the respective physical (real) control element of the Braille device using a finger.

In one embodiment, as accessibility cursor 509 navigates screen 500 to select items on screen 500, Braille caption panel 521 dynamically displays corresponding Braille code 535 and translated text 525 to follow the position of accessibility cursor 509.

Figure 7:
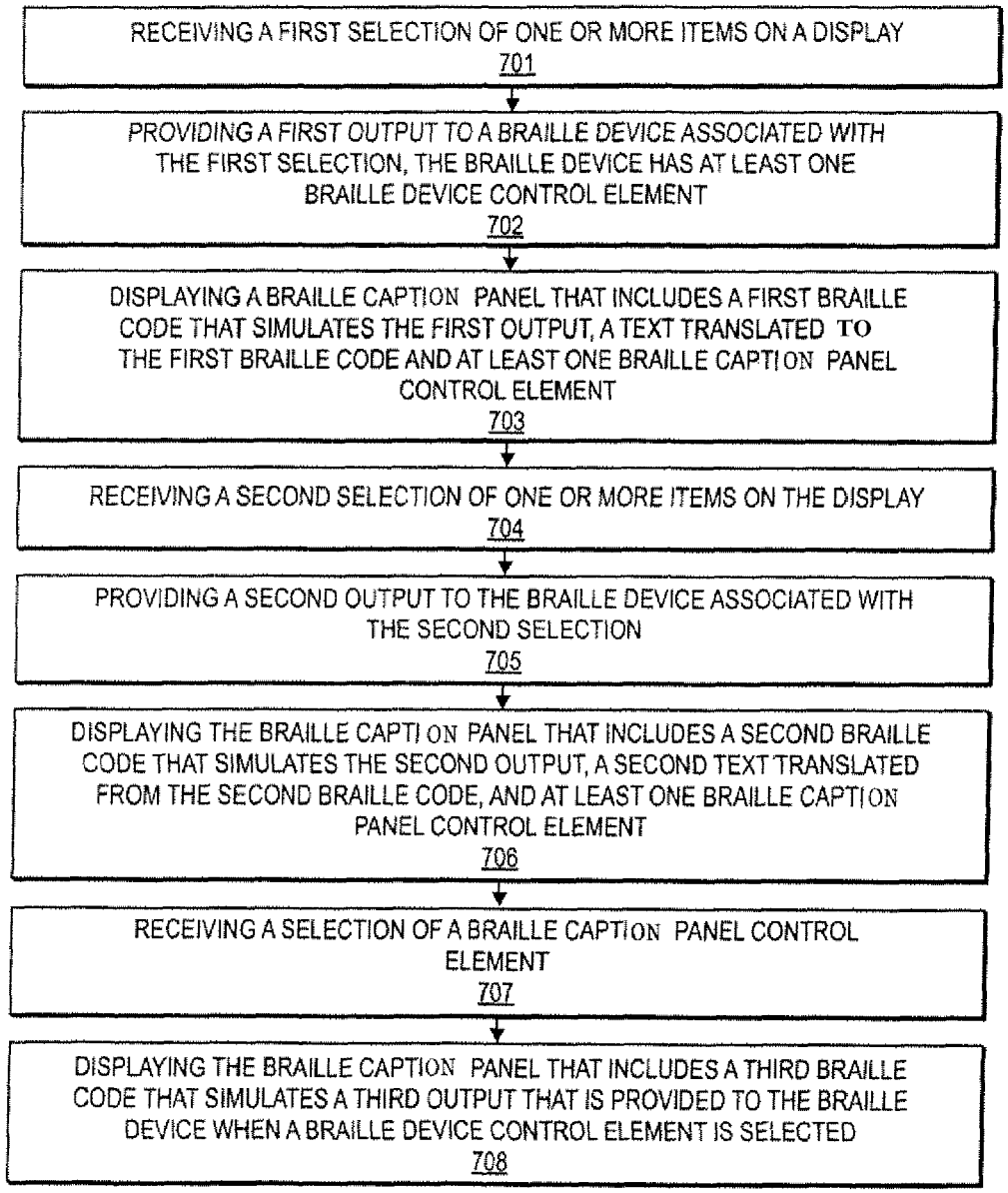
FIG. 7 shows a flowchart of one embodiment of a method to provide an improved Braille support using a Braille caption panel.

FIG. 7 shows a flowchart of one embodiment of a method 700 to provide an improved Braille support using a Braille caption panel. Method 700 begins with operation 701 that involves receiving a first selection of one or more items on a display. For example, a "Delete" item may be selected using accessibility cursor 509, as described above. In operation 702 a first output to a Braille device is provided in response to the first selection of the one or more items on the Braille device. In one embodiment, the Braille device has at least one physical ("first") control element, as described above. In operation 703 displaying a Braille caption panel that includes a first Braille code that simulates the first output, a first text translated to the first Braille code, and at least one Braille caption panel virtual control element is performed, as described above. In one embodiment, operation 702 and operation 703 are performed substantially in the same time. Next, a second selection of one or more items on the display is received in operation 704.

Figure 5B:
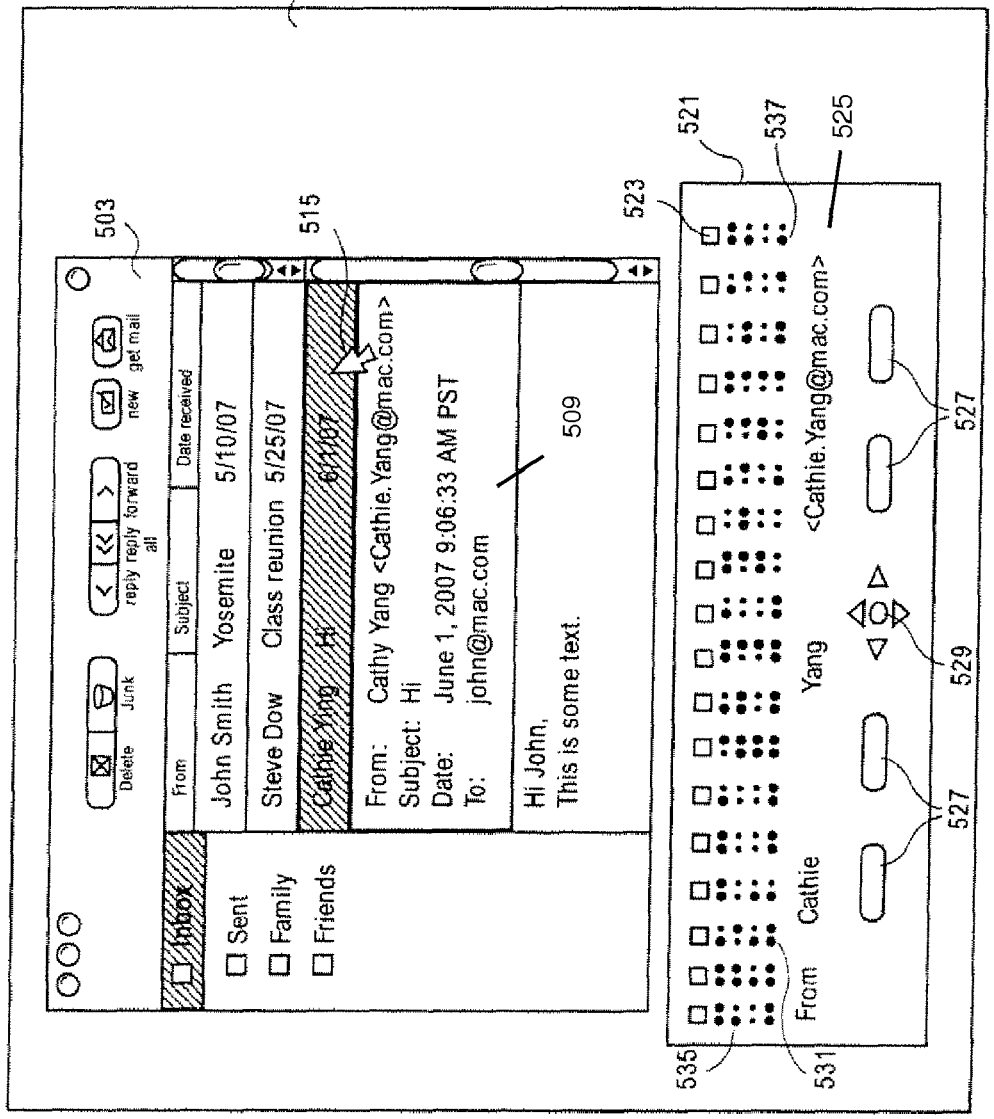

FIG. 5B is a view similar to FIG. 5A, after a second selection of the one or more items on screen 500 is performed. As shown in FIG. 5B, cursor 515 (e.g., a mouse cursor) may select item "Cathie Yang Hi 6/1/07" on screen 500 to display the content of the email. As shown in FIG. 5B, accessibility cursor 509 is placed to select the content of the email to provide the second output to the Braille device. As shown in FIG. 5B, items "From: Cathie Yang<CathieYang@mac.com>Subject:Hi Date:June 1, 2007, 9:06:33 AM PST To:John@mac.com" are selected using accessibility cursor 509. In one embodiment, the second output to the Braille device is provided that is associated with the second selection on screen 500. As shown in FIG. 5B, Braille caption panel 521 includes a Braille code 535 and translated text 525 associated with the second output to the Braille device. As shown in FIG. 5B, translated text 525 includes "From Cathie Yang CathieYang@mac.com" that simulates the second output to the Braille device. As shown in FIG. 5B, a portion of items selected by accessibility cursor 509 is displayed on caption panel 521 to simulate an output to the Braille device. In one embodiment, one or more control keys, such as keys 529 can be pressed to display other selected items.

Referring back to FIG. 7, method 700 continues with operation 705 that involves providing a second output to the Braille device that is associated with the second selection, as described above. The Braille caption panel that includes a second Braille code that simulates the second output and a second text translated to the second Braille code, and at least one Braille caption panel control elements is displayed in operation 706. In one embodiment, operation 705 and operation 706 are performed substantially in the same time.

Figure 5C:
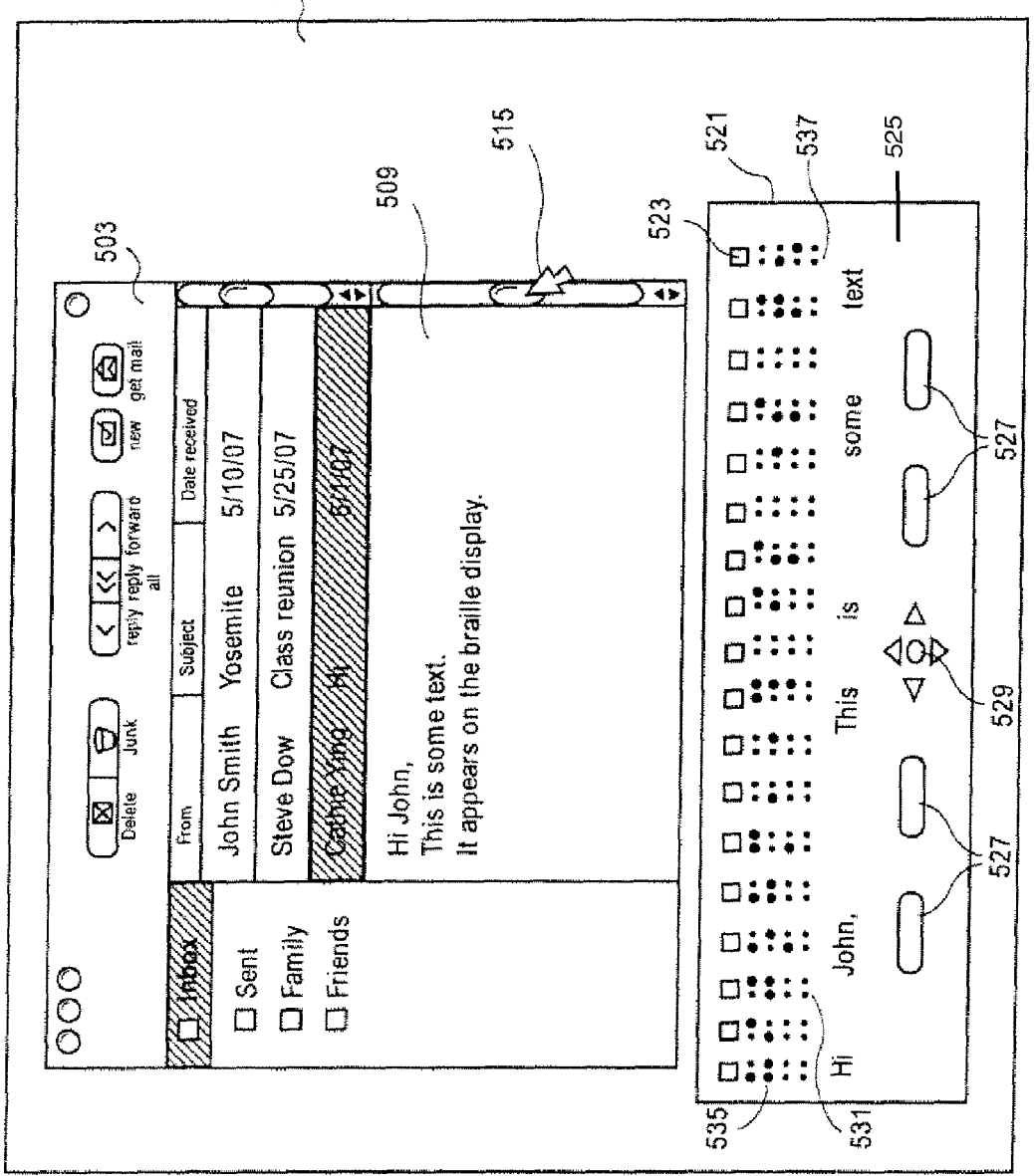

FIG. 5C is a view similar to FIG. 5B, after another selection of the one or more items on screen 500 is performed. As shown in FIG. 5C, accessibility cursor 509 is placed to select the following text:
Hi John,
This is some text.
It appears on the Braille display.

In one embodiment, an output to the Braille device is provided that is associated with another selection on screen 500. Braille caption panel 521 includes a Braille code 535 and translated text 525 associated with this output to the Braille device. As shown in FIG. 5C, translated text 525 includes "Hi John, This is some text" that simulates the third output to the Braille device.

Referring back to FIG. 7, method 700 continues with operation 707 that involves receiving a selection of at least one Braille caption panel control element. Method 700 continues with operation 708 that involves displaying the Braille caption panel that includes a Braille code that simulates a third output that is provided to the Braille device when at least one real control element on the Braille device is selected.

Figure 5D:
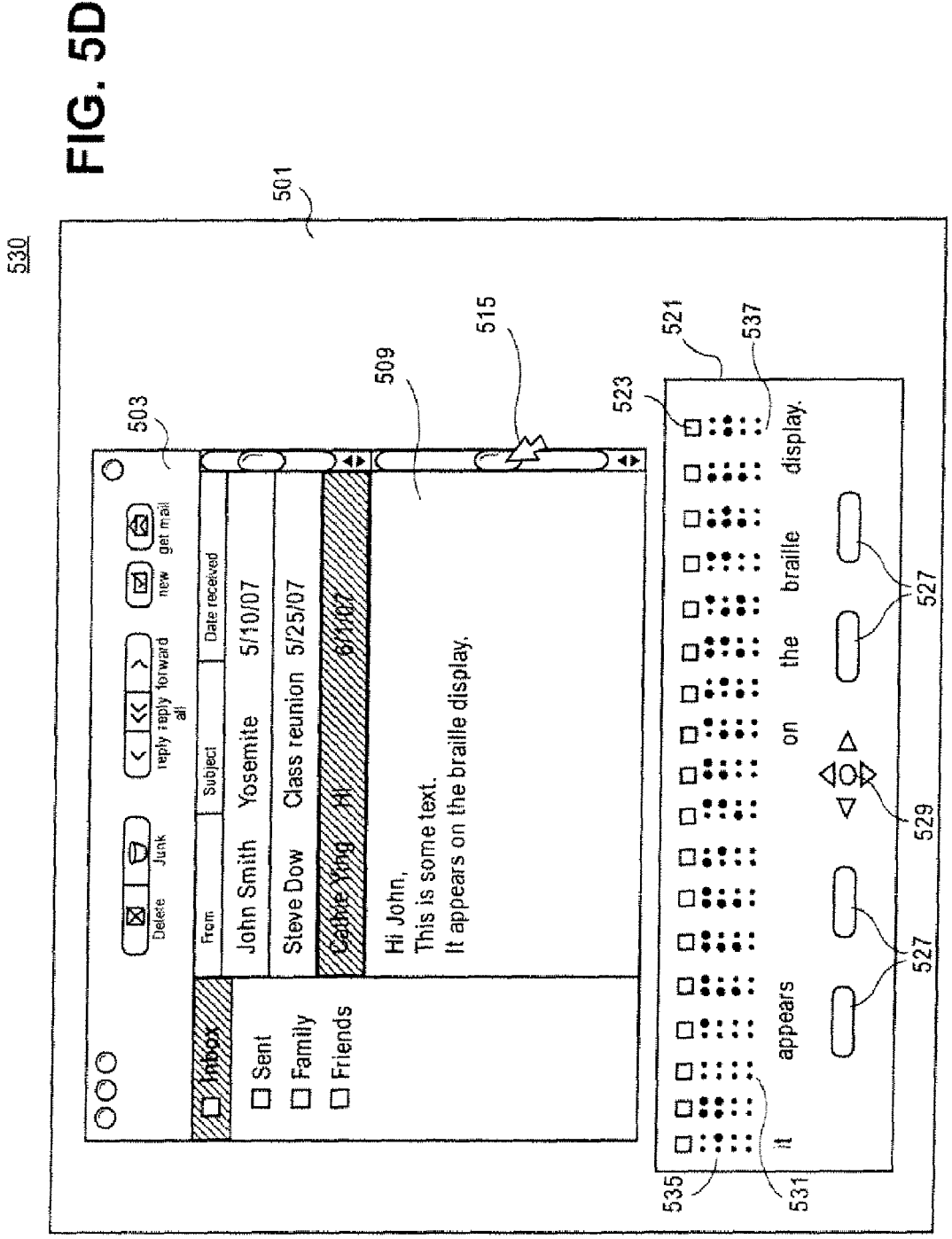

FIG. 5D is a view similar to FIG. 5C, after a selection of a Braille caption panel control element. For example, a right or vertical arrow key of virtual directional keys 529 may be "clicked on" using a mouse. As shown in FIG. 5D, Braille caption panel 521 includes a Braille code 535 and translated text 525 that simulates an output that would be provided to the Braille device if a corresponding real control element on the Braille device were pressed. As shown in FIG. 5C, translated text 525 includes "It appears on the Braille device" that simulates an output that would be provided to the Braille device if a directional key on the Braille device were pressed.

That is, Braille caption panel 521 may be used, for example, to provide a feedback from a non-Braille reader, sighted user who can see a location on screen 500, to a visually impaired user.

Figure 8:
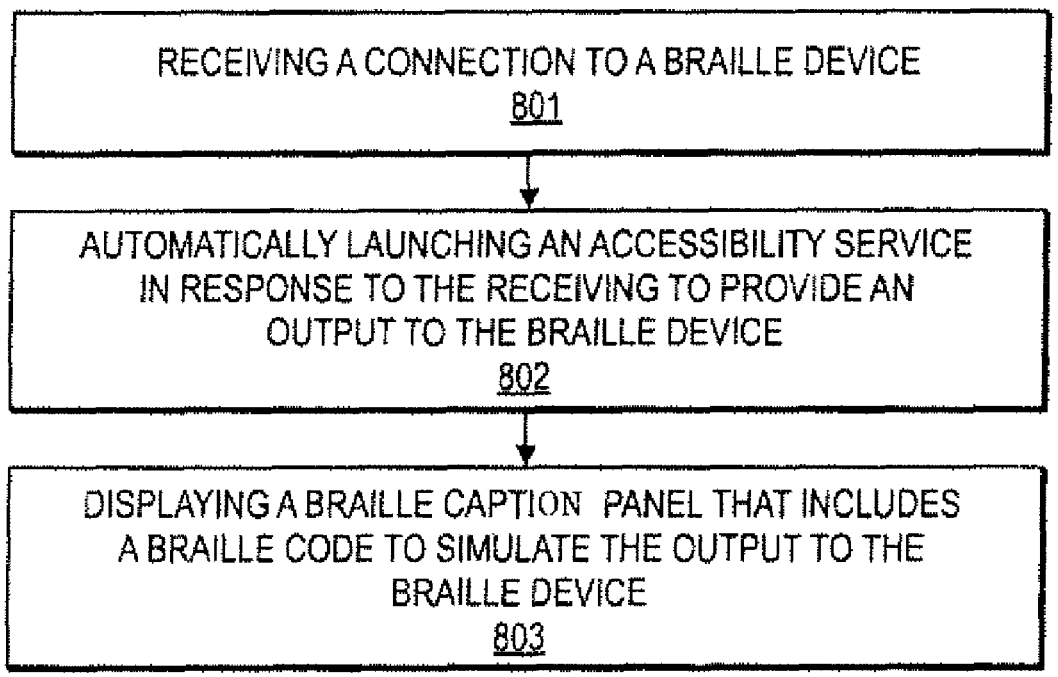
FIG. 8 shows another embodiment of a method to provide an improved Braille support.

FIG. 8 shows another embodiment of a method to provide an improved Braille support. Method begins with operation that involves receiving a connection to a Braille device, as described above. Next, an accessibility service is automatically launched in response to the receiving the connection to the Braille device, to provide an output to the Braille device. In one embodiment, an accessibility service e.g., VoiceOver™ is automatically launched to provide the output to the Braille device. In one embodiment, the operating system of a data processing system recognizes the Braille device in response to receiving a connection signal via a USB port, and automatically launches the accessibility service. A Braille caption panel that includes a Braille code to simulate the output to the Braille device is displayed on a computer screen in operation 803, as described above.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine-implemented method, comprising:
   converting original text to a Braille code;
   generating data for output to a Braille device wherein the output is representative of the original text;
   generating data for display of a Braille caption panel on a graphical user interface of a video display device, wherein the Braille caption panel includes the Braille code as being currently outputted to the Braille device and the original text; and
   generating data for display of the original text outside of the Braille caption panel on the graphical user interface.

2. The machine-implemented method of claim 1, further comprising generating data for display of the original text in the Braille caption panel adjacent to the Braille code in the Braille caption panel.

3. The machine-implemented method of claim 1, wherein the Braille device includes a first control element and wherein the Braille caption panel includes a second control element to simulate the first control element.

4. The machine-implemented method of claim 1, further comprising:
   automatically launching an accessibility service in response to receiving a connection to the Braille device.

5. The machine-implemented method of claim 4, wherein the connection is received via a USB port.

6. A machine-implemented method to provide a Braille support, comprising:
   receiving a first selection of an original text displayed outside of a Braille caption panel on a graphical user interface of a video display device;
   providing a first output associated with the first selection to a Braille device, wherein the output is representative of the original text and wherein the Braille device has at least one first control element; and
   generating data for display of the Braille caption panel on a graphical user interface of the video display device, wherein the Braille caption panel includes a first Braille code that simulates the first output associated with the first selection and the original text, and at least one second control element simulating the at least one first control element of the Braille device.

7. The machine-implemented method of claim 6, further comprising:
   receiving a second selection on the display;
   providing a second output to the Braille device; and
   displaying the Braille caption panel that includes a second Braille code that simulates the second output.

8. The machine-implemented method of claim 6, further comprising:
   receiving a third selection of the at least one second control element; and
   displaying the Braille caption panel that includes a third Braille code that simulates a third output that is provided to the Braille device when the at least one first control element is selected.

9. The machine-implemented method of claim 6, further comprising generating data for display of the original text in the Braille caption panel adjacent to the first Braille code in the Braille caption panel.

10. A machine-implemented method to support a Braille device, comprising:
    receiving a connection to the Braille device;
    automatically launching an accessibility service program in response to the receiving the connection to the Braille device to provide an output to the Braille device, wherein the output is representative of an original text; and
    displaying a Braille caption panel on a graphical user interface of a video display device, wherein the Braille caption panel includes a Braille code as being currently outputted to the Braille device and the original text, wherein the original text is further displayed on the video display device outside of the Braille caption panel on the graphical user interface.

11. A data processing system, comprising:
    a processor;
    a Braille device coupled to the processor; and
    a video display device coupled to the processor, wherein the processor is configured to perform operations, comprising:
       converting original text to a Braille code;
       generating data for output to the Braille device wherein the output is representative of the original text;
       generating data for display of a Braille caption panel on a graphical user interface of the video display device, wherein the Braille caption panel includes the Braille code as being currently outputted to the Braille device and the original text; and
       generating data for display of the original text outside of the Braille caption panel on the graphical user interface.

12. The data processing system of claim 11, further comprising generating data for display of the original text in the Braille caption panel adjacent to the Braille code in the Braille caption panel.

13. The data processing system of claim 11, wherein the Braille device includes a first control element and wherein the Braille caption panel includes a second control element to simulate the first control element.

14. The data processing system of claim 11, wherein the processor is further configured to perform operations, comprising:
    automatically launching an accessibility service in response to receiving a connection to the Braille device.

15. The data processing system of claim 14, wherein the connection is received via a USB port.

16. A data processing system to provide a Braille support, comprising:
    a processor;
    a Braille device coupled to the processor; and
    a video display device coupled to the processor, wherein the processor is configured to perform operations, comprising:

receiving a first selection of an original text displayed on a Braille caption panel on a graphical user interface of the video display device;

providing a first output associated with the first selection to the Braille device, wherein the output is representative of the original text and, wherein the Braille device has at least one first control element; and displaying the Braille caption panel on a graphical user interface of the video display device, wherein the Braille caption panel includes a first Braille code that simulates the first output associated with the first selection and the original text, and at least one second control element simulating the at least one first control element of the Braille device.

17. The data processing system of claim 16, wherein the processor is further configured to perform operations, comprising:

receiving a second selection on the display;

providing a second output to the Braille device; and displaying the Braille caption panel that includes a second Braille code that simulates the second output.

18. The data processing system of claim 16, wherein the processor is further configured to perform operations, comprising:

receiving a third selection of the at least one second control element; and displaying the Braille caption panel that includes a third Braille code that simulates a third output that is provided to the Braille device when the at least one first control element is selected.

19. The data processing system of claim 16, further comprising generating data for display of the original text in the Braille caption panel adjacent to the first Braille code in the Braille caption panel.

20. A data processing system to support a Braille device, comprising:

a processor; and a video display device coupled to the processor, wherein the processor is configured to perform operations, comprising:

receiving a connection to the Braille device;

automatically launching an accessibility service program in response to the receiving the connection to the Braille device to provide an output to the Braille device, wherein the output is representative of an original text; and displaying a Braille caption panel on a graphical user interface of the video display device, wherein the Braille caption panel includes a Braille code as being currently outputted to the Braille device and the original text, wherein the original text is further displayed on the video display device outside of the Braille caption panel on the graphical user interface.

21. A machine-readable non-transitory medium containing executable program instructions which cause a data processing system to perform operations comprising:

converting original text to a Braille code;

generating data for output to a Braille device wherein the output is representative of the original text;

generating data for display of a Braille caption panel on a graphical user interface of a video display device, wherein the Braille caption panel includes the Braille code as being currently outputted to the Braille device and the original text; and generating data for display of the original text outside of the Braille caption panel on the graphical user interface.

22. The machine-readable medium of claim 21, further comprising generating data for display of the original text in the Braille caption panel adjacent to the Braille code in the Braille caption panel.

23. The machine-readable medium of claim 21, wherein the Braille device includes a first control element and wherein the Braille caption panel includes a second control element to simulate the first control element.

24. The machine-readable medium of claim 21, further including data that cause the data processing system to perform operations comprising:

automatically launching an accessibility service in response to receiving a connection to the Braille device.

25. The machine-readable medium of claim 24, wherein the connection is received via a USB port.

26. A machine-readable non-transitory medium containing executable program instructions which cause a data processing system to perform operations comprising:

receiving a first selection of an original text displayed on a Braille caption panel on a graphical user interface of a video display device;

providing a first output associated with the first selection to a Braille device, wherein the output is representative of the original text and wherein the Braille device has at least one first control element; and generating data for display of the Braille caption panel on a graphical user interface of the video display device, wherein the Braille caption panel includes a first Braille code that simulates the first output associated with the first selection and the original text, and at least one second control element simulating the at least one first control element of the Braille device.

27. The machine-readable medium of claim 26, further including data that cause the data processing system to perform operations comprising:

receiving a second selection on the display;

providing a second output to the Braille device; and displaying the Braille caption panel that includes a second Braille code that simulates the second output.

28. The machine-readable medium of claim 26, further including data that cause the data processing system to perform operations comprising:

receiving a third selection of the at least one second control element; and displaying the Braille caption panel that includes a third Braille code that simulates a third output that is provided to the Braille device when the at least one first control element is selected.

29. The machine-readable medium of claim 26, further comprising generating data for display of the original text in the Braille caption panel adjacent to the first Braille code in the Braille caption panel.

30. A machine-readable non-transitory medium containing executable program instructions which cause a data processing system to perform operations comprising:

receiving a connection to the Braille device;

automatically launching an accessibility service program in response to the receiving the connection to the Braille device to provide an output to the Braille device, wherein the output is representative of an original text; and displaying a Braille caption panel on a graphical user interface of a video display device, wherein the Braille caption panel includes a Braille code as being currently outputted to the Braille device and the original text, wherein the original text is further displayed, on the video display device, outside of the Braille caption panel on the graphical user interface.

31. A data processing system, comprising:
- means for converting original text to a Braille code;
- means for generating data for output to a Braille device wherein the output is representative of the original text;
- means for generating data for display of a Braille caption panel on a graphical user interface of a video display device, wherein the Braille caption panel includes the Braille code as being currently outputted to the Braille device and the original text; and
- means for generating data for display of the original text outside of the Braille caption panel on the graphical user interface.

32. A data processing system to provide a Braille support, comprising:
- means for receiving a first selection of an original text on a Braille caption panel on a graphical user interface of a video display device;
- means for providing a first output associated with the first selection to a Braille device, wherein the output is representative of the original and wherein the Braille device has at least one first control element; and
- means for generating data for display of the Braille caption panel on a graphical user interface of the video display device, wherein the Braille caption panel includes a first Braille code that simulates the first output associated with the first selection and the original text, and at least one second control element simulating the at least one first control element of the Braille device.

33. A data processing system to support a Braille device, comprising:
- means for receiving a connection to the Braille device;
- means for automatically launching an accessibility service program in response to the receiving the connection to the Braille device to provide an output to the Braille device, wherein the output is representative of an original text; and
- means for displaying a Braille caption panel on a graphical user interface of a video display device, wherein the Braille caption panel includes a Braille code as being currently outputted to the Braille device and the original text, wherein the original text is further displayed on the video display device outside of the Braille caption panel on the graphical user interface.

* * * * *